United States Patent [19]
Finlay et al.

[11] Patent Number: 5,408,539
[45] Date of Patent: Apr. 18, 1995

[54] TESSELLATING AND QUADDING PELS DURING IMAGE TRANSFER

[76] Inventors: David E. Finlay, 6210 E. Via De La Yerba, Tucson, Ariz. 85715-1150; Lisa L. Fischer, 428 Arapahoe Ave., Boulder, Colo. 80302; Stephen D. Hanna, 5540 E. Paseo Cimarron, Tucson, Ariz. 85715-1101

[21] Appl. No.: 85,678

[22] Filed: Jun. 30, 1993

Related U.S. Application Data

[63] Continuation of Ser. No. 591,534, Oct. 1, 1990, abandoned.

[51] Int. Cl.6 .................................................. G06K 9/32
[52] U.S. Cl. ........................................ 382/46; 382/47; 395/166; 358/443
[58] Field of Search .................... 382/46, 27, 44, 47, 382/41, 45; 358/443, 444, 460; G06K 9/56, 9/32; H04N 1/40, 1/417; G09G 1/06, 1/16; 395/166, 137, 139

[56] References Cited

U.S. PATENT DOCUMENTS

| | | | |
|---|---|---|---|
| 4,593,407 | 6/1986 | Konishi et al. | 382/46 |
| 4,627,097 | 12/1986 | Finlay et al. | 382/46 |
| 4,648,119 | 3/1987 | Wingfield et al. | 382/27 |
| 4,667,295 | 5/1987 | Preston, Jr. | 382/27 |
| 4,741,635 | 5/1988 | Shibata et al. | 400/121 |
| 4,829,452 | 5/1989 | Kang et al. | 382/46 |
| 4,831,368 | 5/1989 | Masimo et al. | 382/46 |
| 4,881,069 | 11/1989 | Kameda et al. | 340/735 |
| 4,942,541 | 7/1990 | Hoel et al. | 395/166 |
| 5,003,496 | 3/1991 | Hunt, Jr. et al. | 395/166 |

Primary Examiner—Yon J. Couso

[57] ABSTRACT

Pipelined image data transfer which tessellates and quads the data while transferring. The output data from the transfer can be selectively in quad or linear format. Such tessellating and formatting is performed in-line using alternate buffers for pipelining so that there is effectively no delay for performing the operations. The operations are performed by unique input and output buffer and image storage addressing.

6 Claims, 4 Drawing Sheets

TESSELLATING AND QUADDING PELS DURING IMAGE TRANSFER

This is a continuation of application Ser. No. 07/07/591,534, filed Oct. 1, 1990, and now abandoned.

DOCUMENTS INCORPORATED BY REFERENCE

Patent application Ser. No. 065,701 which is a continuation of Ser. No. 219,686, now abandoned, IMPROVED PATTERN MOVER FOR RASTER PRINTING, is incorporated by reference to show the rotation of text and images in page (all-points-addressable) printers using image data organized by quads.

BACKGROUND AND SUMMARY OF THE INVENTION

This invention relates to the transfer of image data to an all-points-addressable printer and particularly to tessellating and quadding the image data during the transfer.

Page printers are so named because they operate by composing an entire page before printing as contrasted to line printers which print a line at a time. The advantage of page printers is that graphics, images, and data can be easily composed on a single page very quickly. Page printers are usually laser types and print one hundred or more pages per minute. Page printers can also print text and images in varying orientations, i.e., in any of the four 90-degree rotations on the page to support landscape and portrait orientations as well as duplex and tumble duplex.

Storing all the text font and image data for each of the four possible orientations would require an inordinate amount of memory so logic circuits are used to rotate fonts and images to the desired orientation during data transfer using the image data arranged in quads, i.e., four-by-four arrays of pels, each pel being represented by a bit.

To compose an entire page requires a large amount of memory. At 240 pels per inch resolution, an 8½-by-11 inch (A-size) page contains 5,385,600 pels. To compose one page while another is printing would require twice as much memory, viz., 10,771,200 bits at one bit per pel. To reduce memory requirements, printer control units are designed with only enough raster buffer memory to contain a small width or swath of pels to be printed on each page. As a page is printed, the swath is filled with pels for each successive portion of the page.

The swath is composed in a raster buffer, so named because the laser printhead causes the page to be printed in raster fashion. Whenever an image is larger than the swath width, the image must be subdivided into rectangular tiles that will fit in the swath buffer. (This subdivision is called tessellation.)

In accordance with the invention, a page printer controller uses a memory to store pels representing an image to be printed. The memory has an input addressing circuit that generates a series of locations in the memory where data is to be stored so as to tessellate images that are too large to be stored in the memory at one time. There is also an output addressing circuit that generates a series of locations in the memory so as to read out the pels of the image in quad format.

By performing the tessellation and quadding operations in-line with image transfer, the number of times the image data must be moved is minimized, image processing speed is increased, and processor intervention is eliminated.

BRIEF DESCRIPTION OF THE DRAWING

The invention is described in detail by referring to the various figures which illustrate specific embodiments of the invention, and wherein like numerals refer to like elements.

DESCRIPTION OF THE PREFERRED EMBODIMENT

Pels, sometimes called pixels, are picture elements, usually dots, that make up a page of text or images or combinations thereof. In black and white printing, a pel having a value of 0 usually represents a white dot, i.e., absence of ink, and a pel having a value of 1 represents a black dot, i.e., a drop or dot of ink applied. Pel resolution refers to the number of dots per linear unit of square area, i.e., 240 pels means a square inch divided into 240 rows of 240 pels each for a total of 57,600 individual pels per square inch. An input image can be visualized as a string of pels representing a given area of a printed page. The string is binary for black and white, a bit representing each pel.

In the following description, register contents are sometimes shown or referred to by individual bits or subgroups of bits in the register. The bits are identified by numbers separated by a colon, e.g., A(4:9) would denote bits 4 through 9 from a register labelled A. The high order bit is bit 0 and the low order bit of a 32-bit register is bit 31. If only one bit is described, it is preceded by a colon thus, A(:8).

Figure 1:
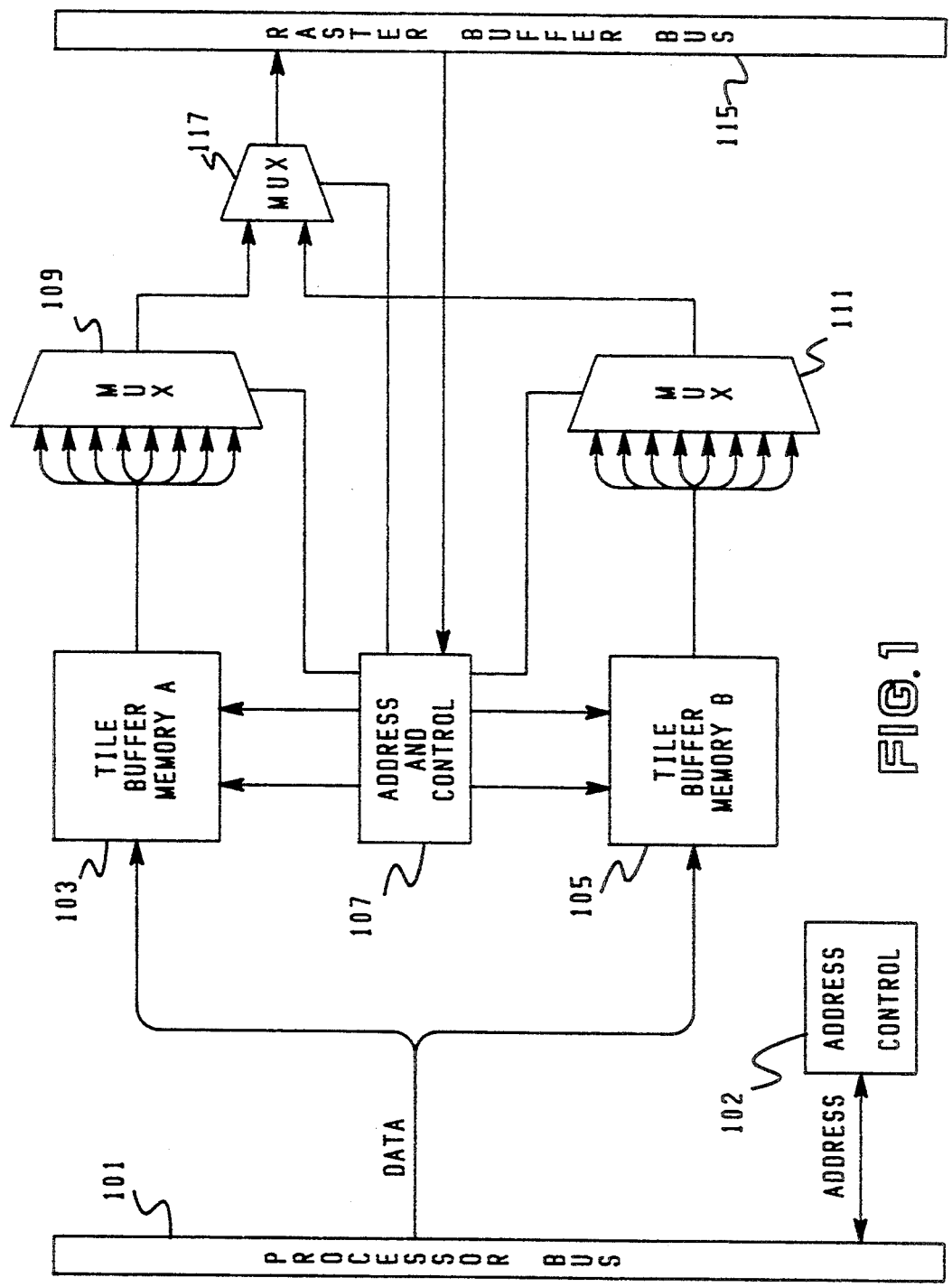
FIG. 1 is a block diagram of the system of the invention.

The system of FIG. 1 provides image transfer to a raster buffer bus 115 from a processor bus 101. An image storage is coupled to the processor bus and contains images to be printed. The images selected for printing are moved from the image storage to a pattern storage via the raster buffer bus. From the pattern storage, the print data is moved to a raster buffer that stores the data that actually controls the printing. The raster buffer contains a swath of a page, i.e., a narrow band of the data that is to be printed on a page. New data is put into the buffer memory from the pattern storage so that successive swaths are printed across a page until the entire page has been printed.

To print the images in any of the four possible 90-degree orientations, the print data is stored in the pattern storage as quads of pels. A quad of pels is a two-dimensional four-by-four array of 16 pels, or bits since each pel is represented by a bit. Details of a system that rotates the images by manipulating the quads is shown in the patent application incorporated herein by reference.

As shown in FIG. 1, two tile buffer memories 103 and 105 are used as temporary storage between the image store, accessed from the processor bus 101, and the pattern store, accessed from the raster buffer bus 115. The two tile buffer memories 103 and 105 operate as an image pipeline by functioning in ping-pong fashion, i.e., one tile buffer memory is be filled with data while the other is being emptied. This allows concurrent transfers on each independent bus to improve the overall performance of the system as well as preventing data availability errors.

Independent image transfer devices allow simultaneous maximum bandwidth operations on each bus through the use of dual buffers which act as a data pipeline. To enhance performance further, requests for image transfers can be queued or stacked by the hardware to avoid set up delays. Also, blocks of images that are all black or all blank spaces are identified. As these blocks contain no new image information, the overall image transfer rate can be improved by eliminating the blocks from the transfer.

The tile buffer memories 103 and 105 are filled with image data from the image store by a DMA operation on the processor bus 101. They are unloaded onto the raster buffer bus 115 by a DMA operation on the raster buffer bus. The control logic insures that the loading and unloading are performed in correct sequence and that data is not destroyed or lost.

The raster buffer bus DMA performs a set up operation to initiate an image transfer from the image storage to the tile buffer memory. After the set up procedure, the raster buffer DMA waits until a tile buffer memory is filled and then begins to transfer the data to the raster buffer bus. The transfer block size can typically be a minimum of 4×4 bits and a maximum of 128-by-128 bits, a full tile.

Using suitable bits to indicate that the tile buffer memories 103 and 105 are filled, the system alternately loads and unloads the tile buffer memories. Two move requests can be stacked by using one tile buffer memory for each move command. The DMA operations are within the skill of the art and a detailed explanation is not required for an understanding of the invention.

The address and control unit 107 supplies addresses to the tile buffer memories 103 and 105 and controls multiplexors 109 and 111 which, as will be seen in the following detailed explanation, represent a network of multiplexors. The address and control unit 107 also controls a multiplexor 117 used for alternating the tile buffer memory that has access to the raster buffer bus 115.

Commands and register data for controlling the address and control unit 107 are supplied by the DMA device from the raster buffer bus 115.

An address control circuit 102 supplies addresses over the processor bus 101 to the image store. The data read from the locations in the image store are written to the tile buffer memories 103 and 105 at the location addresses supplied by the address and control unit 107.

As will become evident from the following detailed description, the address control circuit 102 supplies a sequence of addresses so as to tessellate the image being transferred. The addresses from the address and control unit 107 will supply sequences of addresses that will cause the output data from the tile buffer memories 103 and 105 to be formatted as quads.

The tessellation operation will be described first. For purposes of illustration, the maximum size of a tile, i.e., a rectangle that will fit in the swath, is taken to be a $\frac{1}{2}$-by-$\frac{1}{2}$ inch portion of the page or 128 pels at pel resolution of 240 pels per inch. The swath width is the same width as a tile but as long as the page being printed. The page is considered to be traversed by the printhead, i.e., the raster direction, from the bottom to the top of the page, or vice versa.

Hardware tessellation, if required because of the size of the image, is performed by correctly sequencing the addresses to the image store during image data retrieval so that the image is subdivided into square tiles. The address control circuit 102 supplies a correct sequence of addresses to transfer the image whether the image is to be tessellated or not.

An image will be tessellated if its width, represented by a value denoted as TTW (Total Tessellation Width) is greater than the width of the pattern (swath) denoted by a value PW (Pattern Width). The values of TTW and PW are measured in words. A word in the embodiment being described is taken to be 32 bits, each bit representing a pel. If the value of TTW is equal to or less than the value of PW, no tessellation is required and the address into the image store is merely incremented by one word.

The invention tessellates by incrementing the image address by an offset value calculated by TTW−PW whenever the number of words that comprise a scan line are stored in the tile buffers 103 and 105. A scan is one pel high and from one to four words long as explained below in more detail.

The incoming data from the image store is read serially as H-by-W pels in size and are assumed to be word aligned. Blank pels and blank scans are added to pad the input data out to word boundaries wide and multiples of four scans high. When transferring data from the image store to the pattern, buffer data can be no larger than one tile (128-by-128 pels or 32-by-32 quads) but may be smaller.

The processor bus master DMA loads the initial address from a pattern descriptor register and the initial address is the same whether tessellating or not. The processor bus master DMA also sets the TTW register to indicate the number of words in the width of the image as well as the PW register, a two bit register that specifies the number of words in a scan line. The value in the PW register can be a maximum of four in the described embodiment.

If a word counter value (described below) is not equal to the PW value, the address is incremented by one word. If equal, end of scan line is reached and the address is incremented by the tessellation offset value (if hardware tessellation requested).

Figure 2:
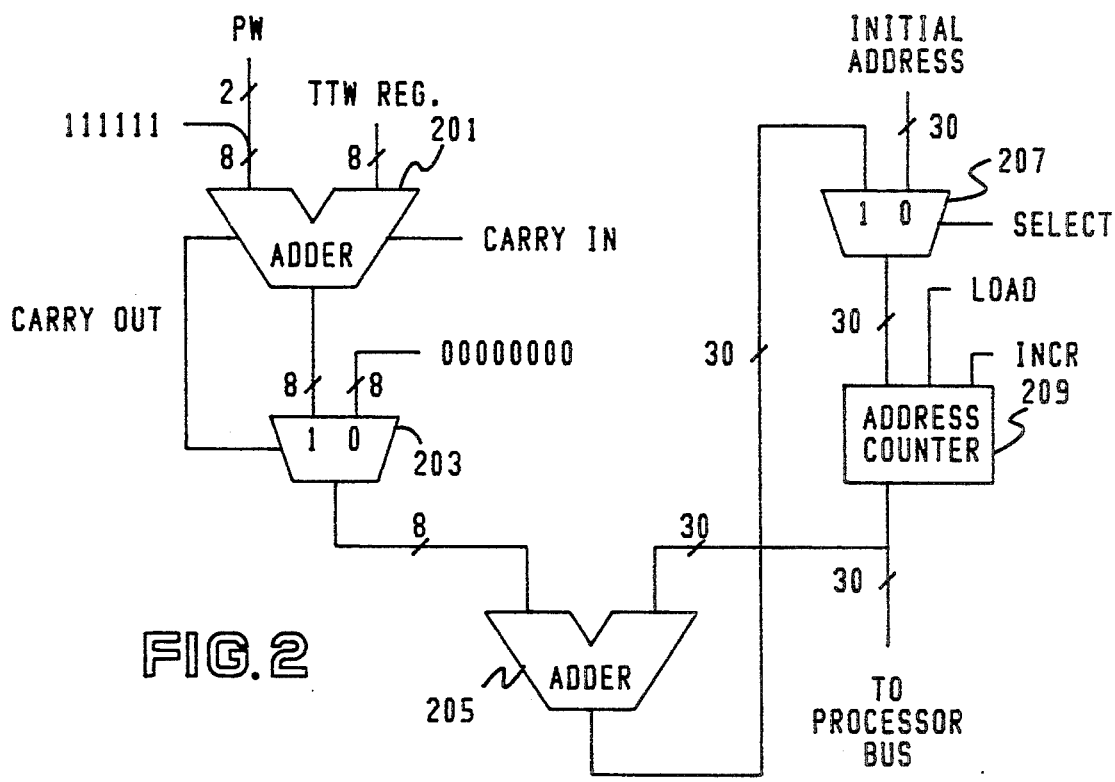
FIG. 2 is a logic diagram of the input address generator that determines whether an image is to be tessellated and, if so, supplies address offsets to an image storage as required to store a tessellated image.

FIG. 2 shows the logic circuitry of the address control 102 for sequencing the image store addresses sent to the processor bus. An eight bit adder 201 is coupled to the PW and the TTW registers. The one's complement of the PW bits are coupled to the adder 201 and supplying a carry in signal makes the one's complement equivalent to the two's complement.

The high order bits of 111111 are supplied to the PW input to the adder 201. The resultant output signals from the adder 201 are therefore TTW−PW. If the value of TTW is greater than the value of PW, a carry out signal is generated. This carry out value is applied to the control input terminal of a multiplexor 203 to gate the adder output signals to a second adder 205.

The initial address supplied by the processor bus master DMA is applied to a multiplexor 207. The select signal to the multiplexor 207 gates the initial address to an address counter 209. The address counter output signals are coupled via the processor bus to the image store. The number of address bits in the illustrative case are shown to be 30, the two low order bus bits being zero to address on a word boundary.

Successive words are read from the image store by incrementing the address counter 209 for each memory cycle. When the proper number of words for a scan have been addressed, the output signals from the adder 205 are coupled via the multiplexor 207 to the address counter 209. The other input signals to the adder 205 are the output signals from the address counter 209. The result is that after every scan is completed, the address is modified by the tessellation offset, TTW−PW.

If the value of TTW is less than or equal to the value of PW, then the adder 201 generates no carry out signal so that the output signals from the multiplexor 203 have a value of zero, i.e., there is no offset signal and no tessellation is performed. The address is incremented by one word.

Figure 4:
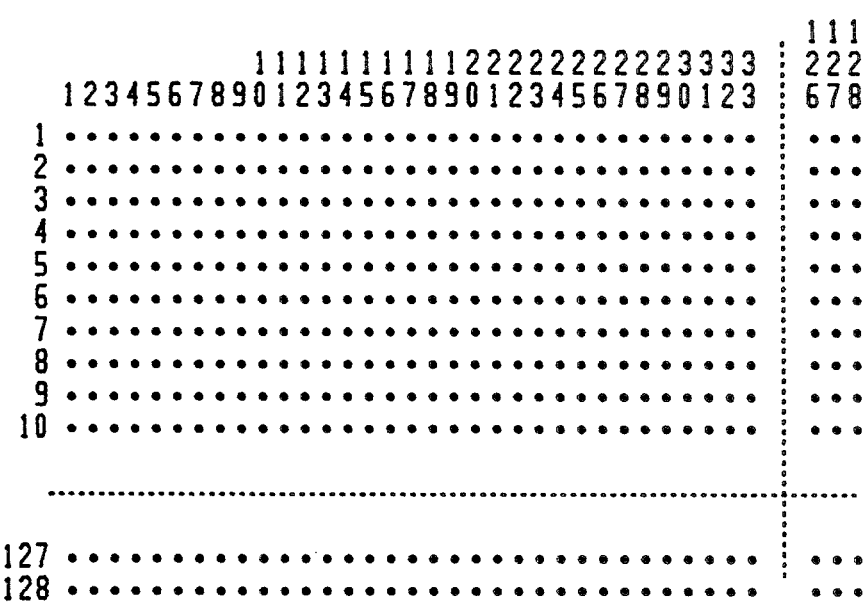
FIG. 4 is a representation of the storage of the image data for purposes of illustration.

FIG. 4 is used to illustrate the storage of pels in the tile buffer memories. The dots represent the stored pels. The rows and columns are numbered 1 to 128. In row 1, the columns 1 through 32 are the first word, columns 33 through 64 are the second word, and so on. Each row, therefore, can contain one to four 32-bit words depending on the value of the PW register. The 128-by-128 pels comprise a tile, the width of the swath.

An example where the image width is nine words (288 pels), 1.2 inches at a printing resolution of 240 pels per inch, is now considered. If the first swath coincides with the beginning of the image, the PW register will be set to a value of four. The TTW value is nine, i.e., nine 32-bit words. Therefore, the initial address will be to the first word of the image which will be written into row 1, columns 1 to 32. The second word is addressed next, because the address is incremented by one word, and stored in row 1, columns 33 to 64. Similarly, the third and fourth words will be retrieved from the image store and stored in row 1, columns 65 to 96 and row 1, columns 97 to 128, respectively. The tessellation offset is 9 words (TTW)−4 words (PW) or 5. The next word of the image to be addressed is word 5 because the address counter 209 is incremented as each word is retrieved. When word 4 was retrieved, the address counter 209 was incremented to address word 5. Therefore, the tessellation offset, 5, is added to the address in the address counter 206, pointing to image word 5, to point to the image word 10. The new address is loaded into the address counter 209 via the multiplexor 207.

The next access to the image store reads out image word 10 which is stored in row 2, columns 1 to 32. As described above, the next three words from the image store are stored in row 2, columns 33 to 64, columns, 65 to 96, and columns 97 to 128. The tessellation offset is again added to the address counter 209 from the adder 205 as previously described. The address in the address counter 209 was pointing to word 14 in the image store so the next word moved from the image store to the tile memory buffer is word 19. Therefore, words 19 to 22 are loaded into row 3.

Assuming there are more than 128 pels in the length of the image, i.e., more than one tile, then the above process continues until the tile buffer is full. The last row, 128, will contain words 1144 to 1147.

To fill the next tile buffer, a new DMA burst cycle is commenced. The initial address via the multiplexor 207 will be that of word 5 of the image being transferred. The PW and TTW settings will be the same. Therefore, the next tile buffer will store words 5 to 8 in row 1, words 14 to 17 in row 2, down to words 1148 to 1151 in row 128.

The next tile, the first one discussed above, is next filled with the last column of words in the image. The new DMA cycle loads the address of word 9, the TTW value of 9, and a new PW value of 1. The image word 9 is stored in row 1, columns 1 to 32. The offset value is now 8 (9−1) which, added to the address counter 209 pointing to image word 10, addresses image word 18. The image word 18 is then loaded into row 2, columns 1 to 32. Words 27 and 36 will be loaded into rows 4 and 5, respectively, in columns 1 to 32. One word per row is stored down to word 1152 in row 128, columns 1 to 32.

The entire scenario is repeated for the next part of the swath beginning at image 1153. If an image does not fill all the rows of a tile buffer, rows are padded until an even number of four rows are filled.

The arrangement of the words in the tile buffer memories are not arranged in-line as shown in FIG. 4 which is only used to describe the sequence of addressing the image words in the image store.

The preceding explanation described the addressing of the image store so as to tessellate an image wider than the swath. The following explains the addressing of the tile buffers to store the image data words in the tile buffer.

Figure 3:
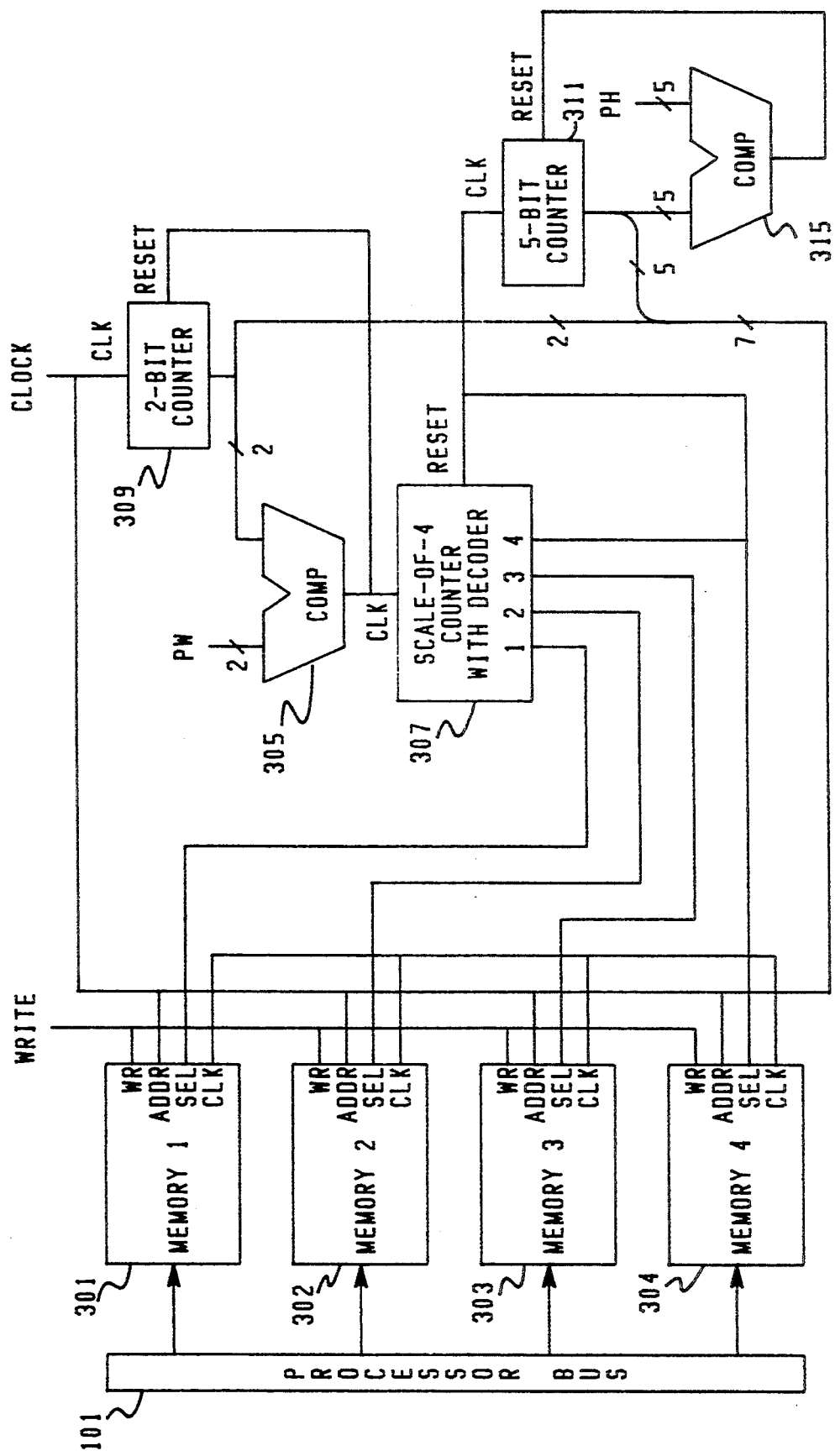
FIG. 3 is logic diagram of the address generator for storing the input image data in buffer memory modules.

The tile buffer input addressing is shown in FIG. 3. Each tile buffer is shown as comprised of four memory modules 301–304 with addressing control logic. There are two such tile buffers of the arrangement shown in FIG. 3 but only one is shown since the operation of both is identical.

The four memory modules 301–304 in the described embodiment have a capacity of 128 32-bit words each for purpose of consistent illustration. A write signal is activated during the write cycle. A clock signal is supplied for each write cycle. The write and clock signals are both applied to all memory modules 301–304 at the same time.

A seven-bit address (capable of specifying 128 separate locations) is also applied to each of the memory modules but is active only to the module which is selected by a SEL signal. A four-bit module counter 307 supplies the select signals in sequence via an included encoder.

A two-bit word counter 309 supplies the low order two bits of the seven-bit address. A five-bit height counter 311 supplies the high order five bits of the seven-bit address. All the counters begin in the reset state, i.e., with zero values.

When the image data word transfers begin, the first word of the first memory module 301 is addressed and the first image is stored therein. The clock signal increments the word counter 309. This addresses the next word in the same module. If the contents of the word counter 309 are the same as those of the PW register, the output signal of a comparator 305 is activated which increments the module counter 307 to address the second memory module 302 and which resets the word counter 309 to zero. The contents of the height counter are not changed.

The above sequence continues until the number of words designated by the PW register have been written into each module. When the module counter 307 counts to four, i.e., when the last word has been written into the fourth memory module 304, the module counter is reset to zero and the height counter 311 is incremented.

When the height counter reaches the value of the pattern height as supplied from a PH register and determined by a comparator 315, the height counter 311 is reset.

This arrangement of addressing means that the four words in the first row of FIG. 4 are in the first memory module 301, the four words in the second row are in the second memory module 302, the four words of the third row are in the third memory module 303, the four words of the fourth row in the fourth memory module 304, the four words of the fifth row in the first memory module 301, and so on. The rows of the memory modules 301-304 are called scans.

When the height counter 311 equals the value of the PH register and the module counter value is four and the word counter value is equal to PW, the DMA burst cycle is complete.

The read out procedure to be described next uses the storage arrangement just described to facilitate a fast tile memory unload in either quad or linear format, the speed being limited only by the memory cycle time. This results in the linear scan of the image data being formatted into quads to perform image rotation as described in the patent application incorporated herein by reference.

For purposes of diagnostics or other applications, it may also be desirable to read out the data in linear fashion.

Figure 5:
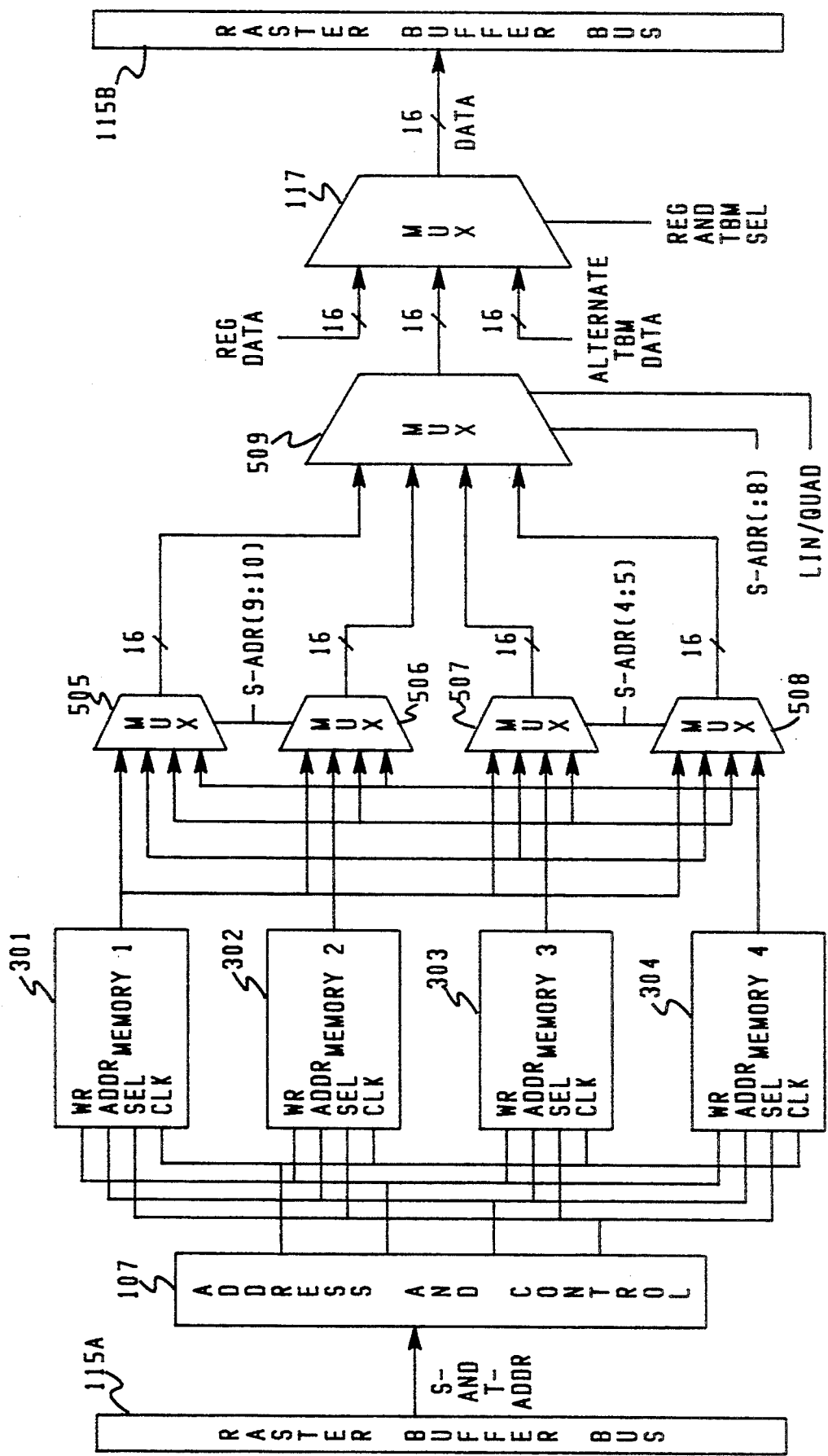
FIG. 5 is a logic diagram for retrieval of image data from the buffer memory modules so as to format the output data as quads.

The read out arrangement is shown in FIG. 5. The addresses to the memory modules 301-304 are supplied over the raster buffer address bus from the S and T registers in the controller. When reading out, all four modules selected at the same time to access the same scan line in each module. Four bits of each scan line are read out to form a quad. In the example above, the first scan line of the four modules respectively contain image words 1, 10, 19, and 28. The first quad read from the memory modules will therefore be comprised of the first four bits of each of the image words 1, 10, 19, and 28. The next quad will be comprised of the second four bits of each such word. Since the first quad is considered the upper left corner quad of the image, it is clear that it is properly composed for rotation.

The addressing scheme for reading out quads comprises an address for this embodiment made up of bits from the T and S registers. The T(6:10) five bits selects one of the 32 quad groups by supplying the first five bits of the word address in each module. In other words, the first five bits of the module address selects a group of four scans.

The other part of the seven-bit address is two bits, S(6:7), which select one of the four scan line from the group of four selected by the first five bits. The 32-bit words from each module are divided into half words of 16 bits. There are two half words from each module for a total of eight half words making up quads, the correct one being selected by three bits S(8:10).

In FIG. 5, the T(6:10) and S(6:7) bits are applied to each module from the address and control unit 107. The select and clock signals are applied to each of the memory modules 301-304 at the same time. The write signal is inactive so a read operation is performed.

The bits from each word retrieved from the memory modules 301-304 are coupled to multiplexors 505-508. The first 16 bits (0:15) of each word are Coupled to the multiplexors 505 and 507. The second 16 bits (16:31) of each word are coupled to the multiplexors 506 and 508.

The multiplexors 505 and 506 are used for reading out quads and the multiplexors 507 and 508 are used for reading linearly.

The bits S(9:10) select a word by selecting the appropriate half words from the multiplexors 505 and 506. The proper half word is selected by a multiplexor 509 by the S(:8) bit and the LIN/QUAD signal in the quad mode.

The selected 16 bit quad is coupled to the raster buffer data bus via a multiplexor 117 which is used to select which tile buffer memory is coupled to the bus as shown in FIG. 1. It also permits register data to be coupled to the bus for purposes not related to the invention.

The addressing scheme described reads out the tile buffer data in the correct sequence for quad formatting. The following addressing scheme is used to read out the tile buffer data for linear formatting.

The T(8:10) bits address a group of four scans as described above. The S(4:5) selects one of the addressed four scans. These addressing bits are applied to the address terminals of the memory modules 301-304.

The S(4:5) bits select the two half words from the multiplexors 507 and 508. The S(:8) bit selects the correct linear half word via the multiplexor 509 when LIN/QUAD is in the linear mode.

While the invention has been particularly shown and described with reference to a preferred embodiment thereof, it will be understood by those skilled in the art that various changes and modifications in form and details may be made therein without departing from the spirit and scope of the invention according to the following claims.

What is claimed is:

1. In a system for controlling page printing by printing adjacent swaths of pels across a page, apparatus for tessellating images wider than the swath width and quadding pels while composing swaths to be printed comprising:

image storage means for storing pel patterns of images, the image storage means having address means for accessing stored images;

tile buffer means for storing at least part of an image to be printed;

first bus means for coupling image data accessed from the image storage means to the tile buffer means;

pattern storage means for storing quads of pels to be printed;

tile retrieval means coupled to the tile buffer means for retrieving image data from the tile buffer means as quads of pels;

second bus means for coupling the tile retrieval means to the pattern storage means; and address control means for supplying addresses to the address means of the image storage means to tessellate images being retrieved by incrementing supplied addresses by a value equal to the difference between an image width and the swath width.

2. The apparatus claimed in claim 1 further including:

addressing unit means for supplying addresses to the tile buffer means at which at least parts of images are to be stored;

multiplexor means for rearranging image data retrieved from the tile buffer means into quads; and means in said addressing unit means for supplying control signals to the multiplexor means.

3. The apparatus as claimed in claim 1 wherein the address control means includes:

subtractor means for supplying an offset address value equal to the difference of a value representing an image width minus the swath width;

address counter means for supplying an address to the address means of the tile buffer means;

adder means coupled to the address counter means and the subtractor means for adding the offset address value to the address in the address counter means; and means for coupling the adder means to the address counter means to set the value of the address counter means to the output value from the adder means.

4. The apparatus claimed in claim 1 wherein the tile buffer means includes a plurality of memory modules and further including:

memory module selecting means for activating each of the plurality of memory modules in succession when image data equal to a swath has been stored;

incremental counters for supplying addresses to said plurality of memory modules at which image data is to be stored; and means responsive to the memory module selecting means for incrementing high address bits.

5. The apparatus claimed in claim 4 wherein the tile retrieval means includes:

address supplying means for supplying a selection address;

a first plurality of multiplexor means coupled to the selection address for selecting the output from a selected one of the plurality of memory modules; and second multiplexor means coupled to receive the output signals from the first plurality of multiplexors means for selecting in response to the selection address and a quadding selection signal which output signal from the first plurality of multiplexors means is to be supplied as an output signal.

6. The apparatus claimed in claim 5 wherein the quadding selection signal controls whether quadding is to be performed.

* * * * *